(12) United States Patent
Ito

(10) Patent No.: US 8,119,765 B2
(45) Date of Patent: Feb. 21, 2012

(54) CROSSLINKABLE FLUORINE-CONTAINING ETHER COMPOUND

(75) Inventor: Takayuki Ito, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 769 days.

(21) Appl. No.: 12/100,352

(22) Filed: Apr. 9, 2008

(65) Prior Publication Data

US 2008/0255337 A1 Oct. 16, 2008

(30) Foreign Application Priority Data

Apr. 10, 2007 (JP) ................................. 2007-103148

(51) Int. Cl.
*C08G 65/04* (2006.01)

(52) U.S. Cl. ........ 528/402; 526/242; 526/246; 526/247; 528/401

(58) Field of Classification Search .................. 528/402, 528/401; 526/242, 246, 247
See application file for complete search history.

(56) References Cited

U.S. PATENT DOCUMENTS

| 2,917,548 | A | * | 12/1959 | Dixon | 568/685 |
| 2009/0230361 | A1 | * | 9/2009 | Seshadri et al. | 252/500 |
| 2009/0281270 | A1 | * | 11/2009 | Fuller et al. | 528/226 |
| 2010/0292399 | A1 | * | 11/2010 | Brown et al. | 524/611 |

FOREIGN PATENT DOCUMENTS

| JP | 2003-026732 A | 1/2003 |
| JP | 2006-299218 A | 2/2006 |
| JP | 2006-316113 A | 11/2006 |

OTHER PUBLICATIONS

Iacono et al., Chem. Commun., pp. 4844-4846 (2006).*

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

A crosslinkable fluorine-containing compound, which is an adduct compound having a crosslinkable group, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

23 Claims, No Drawings

CROSSLINKABLE FLUORINE-CONTAINING ETHER COMPOUND

FIELD OF THE INVENTION

The present invention relates to a crosslinkable fluorine-containing ether compound. In particular, the present invention relates to a novel crosslinkable fluorine-containing polymer.

BACKGROUND OF THE INVENTION

Fluorine-containing polymers are used in various fields such as automobile, semiconductor and chemical industries, by virtue of unique properties of the polymer such as weather resistance, heat resistance, chemical resistance, low refractive property, low dielectric property, water- and oil-repellency and lubricity. Those properties are derived from fluorine atom, and are generally expected to be improved as fluorine contents in the polymer increase. However, aliphatic fluorine-containing polymers are adversely affected by the increase of the fluorine contents. For example, the solubility of those polymers in general organic solvents decreases, resulting in difficulty in handling. In addition, the intermolecular force thereof decreases, resulting in deterioration in its adhesion to other base materials. Accordingly, there has been a demand for developing a method of producing more versatile fluorine polymers by adjusting the fluorine contents and a structure of principal chain freely to thereby obtain desired properties.

On the other hand, there have been proposed a variety of fluorine-containing polymers to which crosslinkable groups were introduced, in order to improve durability and/or hardness (see, for example, JP-A-2003-26732 ("JP-A" means unexamined published Japanese patent application), JP-A-2006-299218 and JP-A-2006-316113). It is impossible, however, to adjust the structure of principal chain and fluorine content of those polymers freely, because they are each obtained by introducing a crosslinkable group to a polymer prepared according to a conventional method (radical polymerization), and there is a limit in available monomers.

SUMMARY OF THE INVENTION

The present invention resides in a crosslinkable fluorine-containing compound, which is an adduct compound having a crosslinkable group, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

Further, the present invention resides in a crosslinkable fluorine-containing compound, which is an adduct compound having a crosslinkable group at a terminal functional group of the adduct compound, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

Further more, the present invention resides in a crosslinkable fluorine-containing compound represented by the following Formula (i):

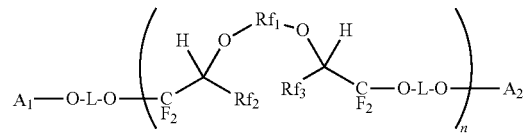

wherein L represents a divalent organic group; $Rf_1$ represents a perfluoroalkylene group, each of $Rf_2$ and $Rf_3$ independently represents a fluorine atom, a perfluoroalkyl group or a perfluoroalkoxy group, and any two of $Rf_1$, $Rf_2$ and $Rf_3$ may be combined with each other to form a ring; each of $A_1$ and $A_2$ independently represents a hydrogen atom or a crosslinkable group, and at least one of $A_1$ and $A_2$ is a crosslinkable group; and "n" represents an integer of 1 or more.

Further, the present invention resides in a crosslinkable fluorine-containing compound represented by the following Formula (ii):

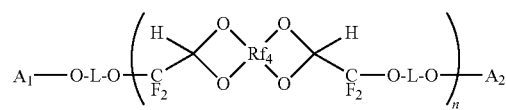

wherein L represents a divalent organic group; $Rf_4$ represents a tetravalent perfluorinated linkage group; each of $A_1$ and $A_2$ independently represents a hydrogen atom or a crosslinkable group, and at least one of $A_1$ and $A_2$ is a crosslinkable group; and "n" represents an integer of 1 or more.

Further, the present invention resides in a crosslinkable fluorine-containing compound represented by the following Formula (iii):

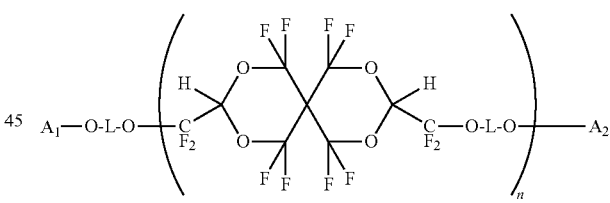

wherein L represents a divalent organic group; each of $A_1$ and $A_2$ independently represents a hydrogen atom or a crosslinkable group, and at least one of $A_1$ and $A_2$ is a crosslinkable group; and "n" represents an integer of 1 or more.

Other and further features and advantages of the invention will appear more fully from the following description.

DETAILED DESCRIPTION OF THE INVENTION

The present invention provides the following means:

(1) A crosslinkable fluorine-containing compound, which is an adduct compound having a crosslinkable group, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

(2) A crosslinkable fluorine-containing compound, which is an adduct compound having a crosslinkable group at a terminal functional group of the adduct compound, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

(3) A crosslinkable fluorine-containing compound represented by the following Formula (i):

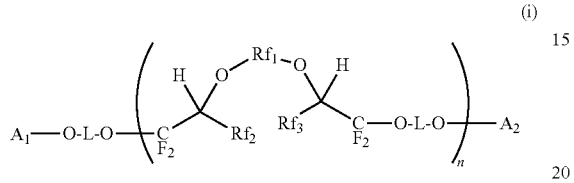

wherein L represents a divalent organic group; $Rf_1$ represents a perfluoroalkylene group, each of $Rf_2$ and $Rf_3$ independently represents a fluorine atom, a perfluoroalkyl group or a perfluoroalkoxy group, and any two of $Rf_1$, $Rf_2$ and $Rf_3$ may be combined with each other to form a ring; each of $A_1$ and $A_2$ independently represents a hydrogen atom or a crosslinkable group, and at least one of $A_1$ and $A_2$ is a crosslinkable group; and "n" represents an integer of 1 or more.

(4) A crosslinkable fluorine-containing compound represented by the following Formula (ii):

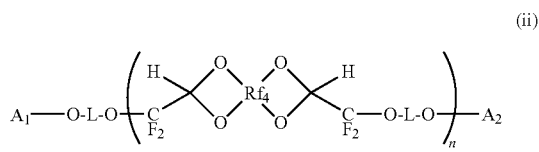

wherein L represents a divalent organic group; $Rf_4$ represents a tetravalent perfluorinated linkage group; each of $A_1$ and $A_2$ independently represents a hydrogen atom or a crosslinkable group, and at least one of $A_1$ and $A_2$ is a crosslinkable group; and "n" represents an integer of 1 or more.

(5) A crosslinkable fluorine-containing compound represented by the following Formula (iii):

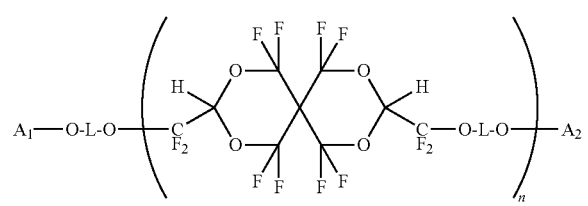

wherein L represents a divalent organic group; each of $A_1$ and $A_2$ independently represents a hydrogen atom or a crosslinkable group, and at least one of $A_1$ and $A_2$ is a crosslinkable group; and "n" represents an integer of 1 or more.

(6) The fluorine-containing compound according to any one of items (3) to (5), where the crosslinkable groups represented by $A_1$ and $A_2$ are each represented by any one of the following formulae G1 to G6:

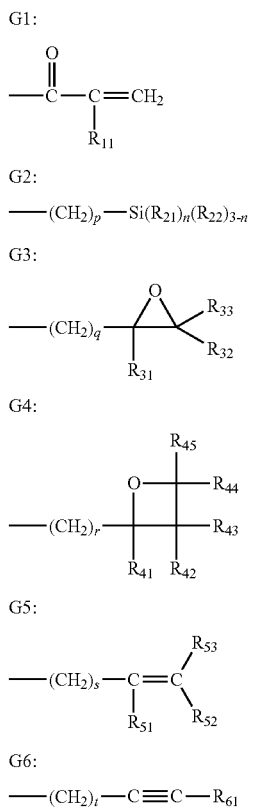

wherein $R_{11}$ represents a hydrogen atom, a fluorine atom, a trifluoromethyl group or an alkyl group having 1 to 4 carbon atoms; $R_{21}$ represents a hydroxyl group, an isocyanato group or a hydrolyzable group; $R_{22}$ represents a hydrogen atom or a hydrocarbon group; each of $R_{31}$, $R_{32}$ and $R_{33}$ independently represents a hydrogen atom or a hydrocarbon group, and any two of these groups may be combined with each other to form a ring; each of $R_{41}$, $R_{42}$, $R_{43}$, $R_{44}$ and $R_{45}$ independently represents a hydrogen atom or a hydrocarbon group, and any two of these groups may be combined with each other to form a ring; each of $R_{51}$, $R_{52}$ and $R_{53}$ independently represents a hydrogen atom or a hydrocarbon group, and any two of these groups may be combined with each other to form a ring; $R_{61}$ represents a hydrogen atom or a hydrocarbon group; each of "p", "q", "r", "s", and "t" independently represents an integer of 1 or more; and "n" represents an integer of 1 to 3.

The compound of the present invention will be explained in detail hereinafter.

The fluorine-containing compound of the present invention is a crosslinkable fluorine-containing compound, which is an adduct compound having a crosslinkable group, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom.

In a preferred embodiment, the fluorine-containing compound having, per molecule, 2 or more terminal fluorine-containing vinyl groups each directly bonded to an oxygen atom is represented by the following Formula (I):

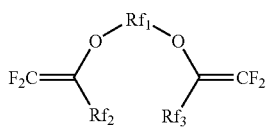
(I)

wherein $Rf_1$ represents a perfluoroalkylene group, each of $Rf_2$ and $Rf_3$ independently represents a fluorine atom, a perfluoroalkyl group or a perfluoroalkoxy group, and any two of $Rf_1$, $Rf_2$ and $Rf_3$ may be combined with each other to form a ring;

The perfluoroalkylene group represented by $Rf_1$ is preferably a perfluoroalkylene group having 1 to 30 carbon atoms, which may be linear, branched or cyclic, and which may have an ether bond in the chain. The perfluoroalkylene group has more preferably 1 to 20 carbon atoms, and still more preferably 2 to 10 carbon atoms.

The perfluoroalkyl group represented by $Rf_2$ and $Rf_3$ is preferably a perfluoroalkyl group having 1 to 30 carbon atoms, which may be linear, branched or cyclic, and which may have an ether bond in the chain. The perfluoroalkyl group has more preferably 1 to 20 carbon atoms, and still more preferably 2 to 10 carbon atoms.

The perfluoroalkoxy group represented by $Rf_2$ and $Rf_3$ is preferably a perfluoroalkoxy group having 1 to 30 carbon atoms, which may be linear, branched or cyclic, and which may have an ether bond in the chain. The perfluoroalkoxy group has more preferably 1 to 20 carbon atoms, and still more preferably 2 to 10 carbon atoms.

In Formula (I), it is preferred that both of $Rf_2$ and $Rf_3$ be fluorine atoms or perfluoroalkoxy groups. When $Rf_2$ and $Rf_3$ are both perfluoroalkoxy groups, the compound is more preferably a compound represented by the following Formula (II):

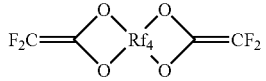
(II)

wherein $Rf_4$ represents a tetravalent perfluorinated linkage group. The tetravalent perfluorinated linkage group represented by $Rf_4$ is preferably a perfluoroalkylene group having 1 to 30 carbon atoms, which may be linear, branched or cyclic, and which may have an ether bond in the chain. The perfluoroalkylene group has more preferably 4 to 20 carbon atoms, and still more preferably 5 to 10 carbon atoms.

Preferable examples of the compound represented by formula (I) and (II) are shown below, but the compounds that can be used in the present invention are not limited to the following specific examples.

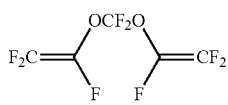
(I-1)

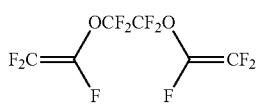
(I-2)

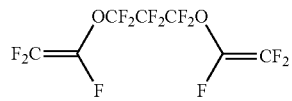
(I-3)

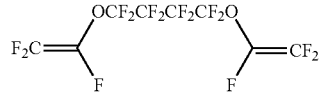
(I-4)

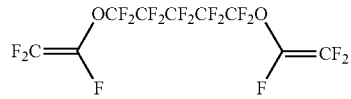
(I-5)

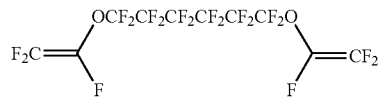
(I-6)

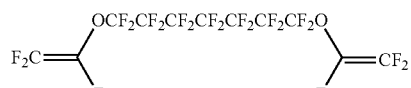
(I-7)

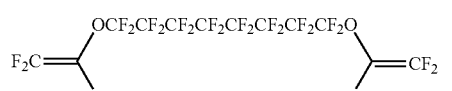
(I-8)

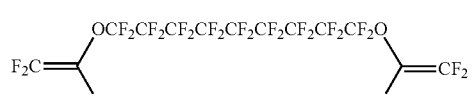
(I-9)

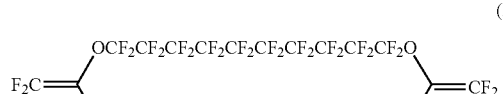
(I-10)

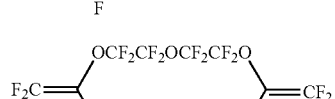
(I-11)

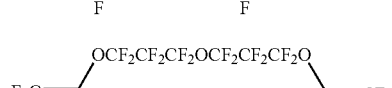
(I-12)

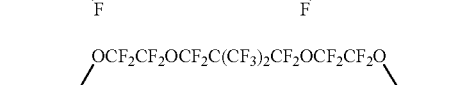
(I-13)

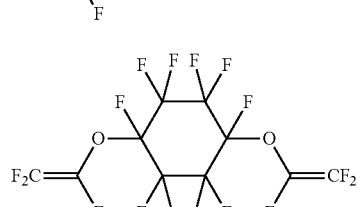
(I-14)

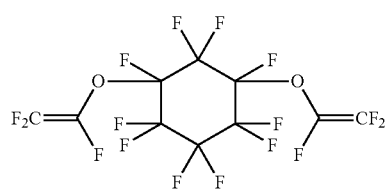
(I-15)

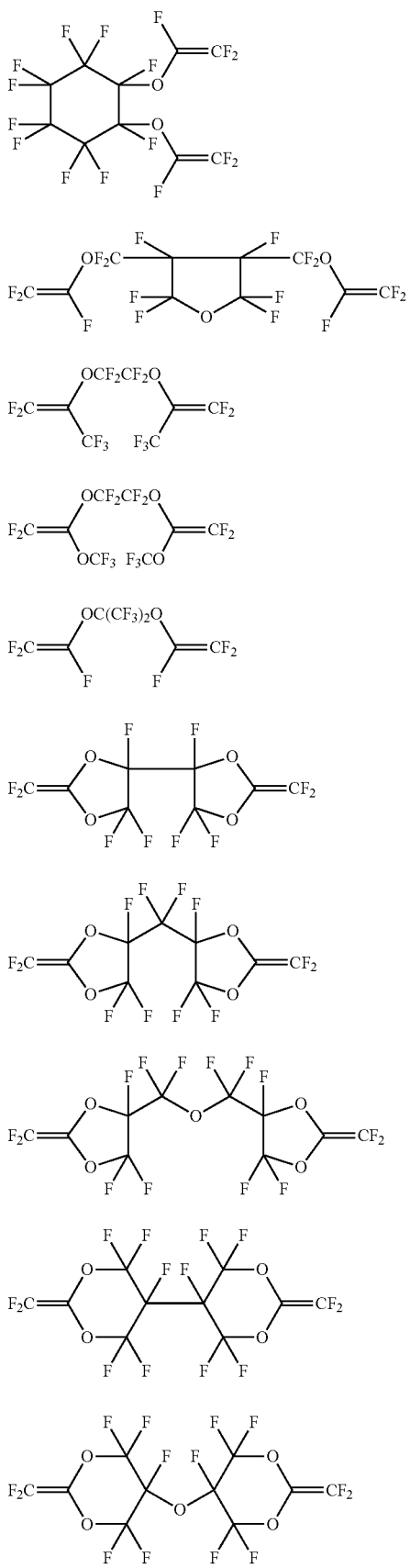

The compound having 2 or more groups represented by —XH (hereinafter briefly referred to as —XH groups), where X represents an oxygen atom or a sulfur atom, is preferably a polyol having 2 or more hydroxyl groups per molecule and is more preferably a compound represented by the following Formula (IV) or (V):

$$Rf_5(CH_2OH)_n \qquad (IV)$$

$$Ar_1-(OH)_n \qquad (V)$$

wherein $Rf_5$ represents a perfluoroalkyl group having a valence of "n"; $Ar_1$ represents an aryl group having a valence of "n"; and "n" represents an integer of 2 to 6.

The perfluoroalkyl group represented by $Rf_5$ having a valence of "n" is preferably a perfluoroalkyl group having 1 to 30 carbon atoms, which may be linear, branched or cyclic, and which may have an ether bond in the chain. The perfluoroalkyl group has more preferably 1 to 20 carbon atoms, and still more preferably 2 to 10 carbon atoms.

The aryl group represented by $Ar_1$ having a valence of "n" is preferably a substituted or unsubstituted aryl group having 6 to 30 carbon atoms. The aryl group has more preferably 6 to 20 carbon atoms, and still more preferably 6 to 10 carbon atoms.

Examples of the substituent of the aryl group include halogen atoms (for example, a fluorine atom, a chlorine atom, a bromine atom, and an iodine atom), alkyl groups having 20 or less carbon atoms (for example, methyl or ethyl), aryl groups having 30 or less carbon atoms (for example, phenyl or naphtyl), a cyano group, a carboxyl group, alkoxycarbonyl groups having 20 or less carbon atoms (for example, methoxycarbonyl), aryloxycarbonyl groups having 30 or less carbon atoms (for example, phenoxycarbonyl), carbamoyl groups (for example, a carbamoyl group, N-phenylcarbamoyl group, N,N-dimethylcarbamoyl group), alkycarbonyl groups having 20 or less carbon atoms (for example, acetyl), arylcarbonyl groups having 30 or less carbon atoms (for example, benzoyl), nitro group, amino groups (for example, amino, dimethylamino, anilino), acylamino groups having 20 or less carbon atoms (for example, acetoamino and ethoxycarbonylamino), sulfonamido groups (for example, methanesulfonamido), imido groups (for example, succinimido and phthalimido), imino groups (for example, benzylideneimino), a hydroxy group, alkoxy groups having 20 or less carbon atoms (for example, methoxy), aryloxy groups having 30 or less carbon atoms (for example, phenoxy), acyloxy groups having 20 or less carbon atoms (for example, acetoxy), alkylsulfonyloxy groups having 20 or less carbon atoms (for example, methanesulfonyloxy), arylsulfonyloxy groups having 30 or less carbon atoms (for example, benzenesulfonyloxy), sulfo groups, sulfamoyl groups (for example, sulfamoyl and N-phenylsulfamoyl), alkylthio groups having 20 or less carbon atoms (for example, methylthio), arylthio groups having 30 or less carbon atoms (for example, phenylthio), alkylsulfonyl groups having 20 or less carbon atoms (for example, methanesulfonyl), arylsulfonyl groups having 30 or less carbon atoms (for example, benzenesulfonyl), and heterocyclic groups. The substituent may be further substituted. When plural substituents are present, they may be the same or different. Further, these substituents may be combined with each other to form a ring.

"n" is preferably 2 or 3, more preferably 2.

Preferable examples of the compound represented by formulae (IV) and (V) are shown below, but the compounds that can be used in the present invention are not limited to the following specific examples.

$HOCH_2CF_2CH_2OH$ (IV-1)

$HOCH_2CF_2CF_2CH_2OH$ (IV-2)

$HOCH_2CF_2CF_2CF_2CH_2OH$ (IV-3)

$HOCH_2CF_2CF_2CF_2CF_2CH_2OH$ (IV-4)

$HOCH_2CF_2CF_2CF_2CF_2CF_2CH_2OH$ (IV-5)

$HOCH_2CF_2CF_2CF_2CF_2CF_2CF_2CH_2OH$ (IV-6)

$HOCH_2CF_2CF_2CF_2CF_2CF_2CF_2CF_2CH_2OH$ (IV-7)

$HOCH_2CF_2CF_2CF_2CF_2CF_2CF_2CF_2CF_2CF_2CH_2OH$ (IV-8)

$HOCH_2CF_2OCF_2CH_2OH$ (IV-9)

$HOCH_2CF_2CF_2OCF_2CF_2CH_2OH$ (IV-10)

$HOCH_2CF_2OCF_2C(CF_3)_2CF_2OCF_2CH_2OH$ (IV-11)

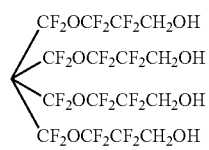
(IV-12)

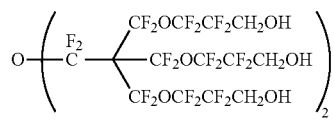
(IV-13)

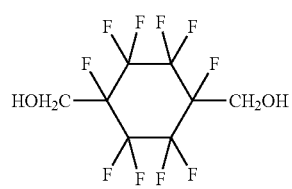
(IV-14)

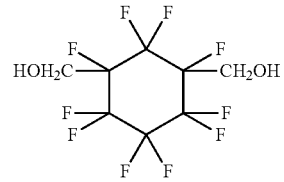
(IV-15)

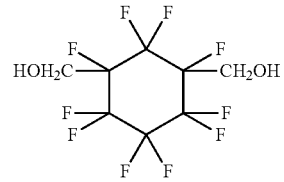
(IV-16)

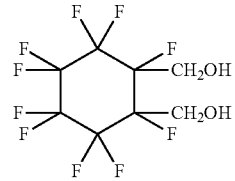
(IV-17)

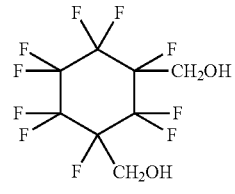
(IV-18)

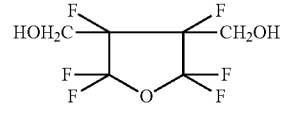
(IV-19)

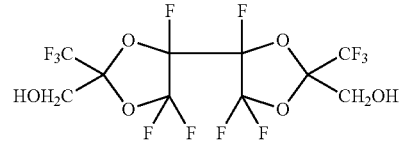
(IV-20)

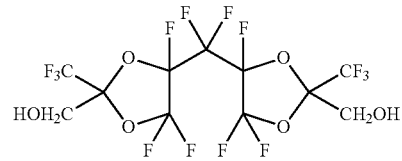
(IV-21)

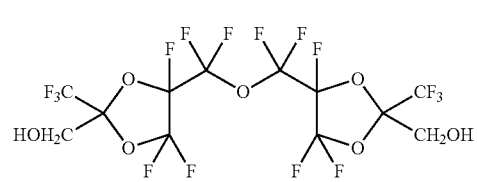
(IV-22)

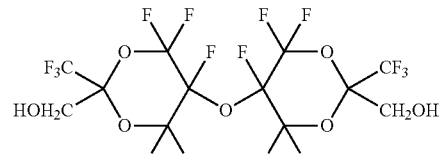
(IV-23)

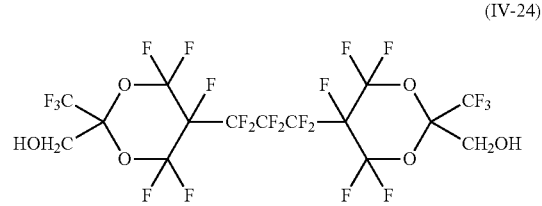
(IV-24)

(IV-25)
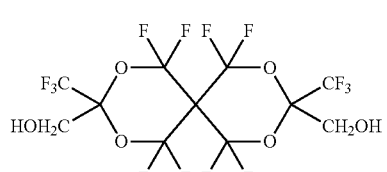
(V-1)
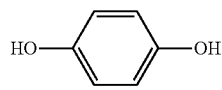
(V-2)
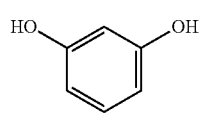
(V-3)
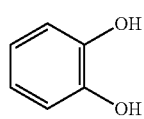
(V-4)
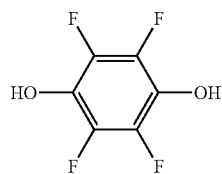
(V-5)
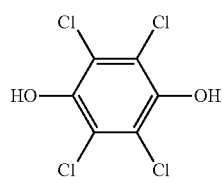
(V-6)
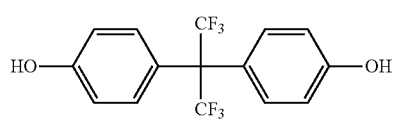
(V-7)
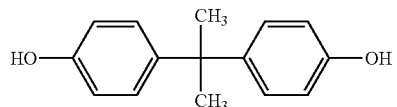
(V-8)
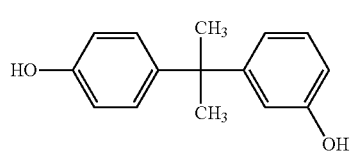
(V-9)
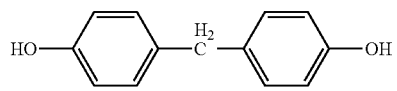
(V-10)
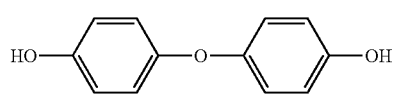
(V-11)
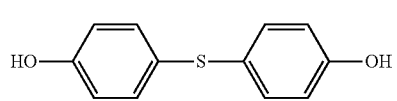
(V-12)
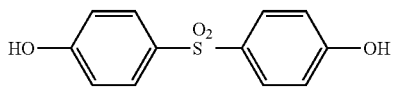
(V-13)
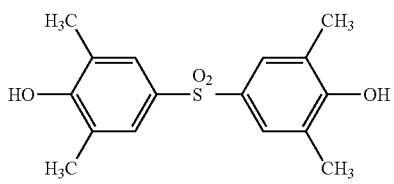
(V-14)
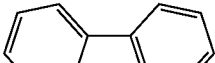
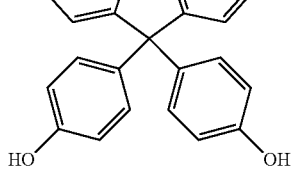
(V-15)
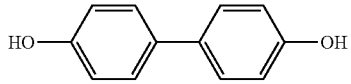
(V-16)
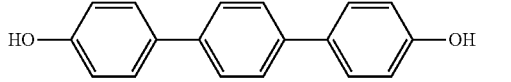
(V-17)
The crosslinkable group for use herein can be any one that causes a crosslinking reaction by the action of energy such as light or heat, a radical, a catalyst such as an acid, a base or a metal, or any combination of those. Preferred examples include the crosslinkable groups represented in the following formulae G1 to G6.
G1:
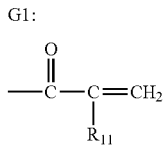
G2:
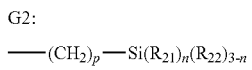
G3:
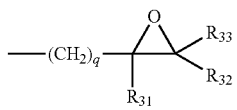
G4:
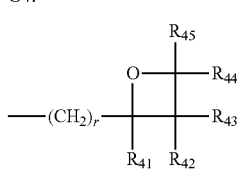

-continued

G5:

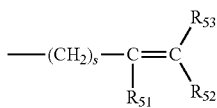

G6:

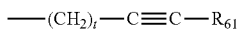

In formula G1, $R_{11}$ represents a hydrogen atom, a fluorine atom, a trifluoromethyl group, or an alkyl group having 1 to 4 carbon atoms, and is preferably a hydrogen atom or a methyl group.

In formula G2, $R_{21}$ represents a hydroxyl group, an isocyanato group, or a hydrolyzable group; $R_{22}$ represents a hydrogen atom or a hydrocarbon group; "p" represents an integer of 1 or more; and "n" represents an integer of 1 to 3. The "hydrolyzable group" in $R_{21}$ refers to a group that is converted into a hydroxyl group through a hydrolysis reaction, and examples thereof include: halogen atoms such as a fluorine atom, a chlorine atom, a bromine atom, and an iodine atom; alkoxy groups such as a methoxy group, an ethoxy group, a propoxy group, and a butoxy group; and acyloxy groups such as an acetyloxy group and a propionyloxy group. $R_{21}$ is preferably a hydroxyl group or an alkoxy group and is particularly preferably a hydroxyl group or a methoxy group. The hydrocarbon group represented by $R_{22}$ is preferably a substituted or unsubstituted, linear, branched or cyclic alkyl group having 1 to 10 carbon atoms, a substituted or unsubstituted, linear, branched or cyclic alkenyl group having 2 to 10 carbon atoms, a substituted or unsubstituted, linear, branched or cyclic alkynyl group having 2 to 10 carbon atoms, or a substituted or unsubstituted aryl group having 6 to 10 carbon atoms. It is more preferably a methyl group, an ethyl group, a vinyl group, an allyl group or a phenyl group.

The number "p" is preferably an integer of 1 to 4 and more preferably 2 or 3. The number "n" is preferably 3.

In formula G3, each of $R_{31}$, $R_{32}$ and $R_{33}$ independently represents a hydrogen atom or a hydrocarbon group, and any two of these groups may be combined with each other to form a ring; "q" represents an integer of 1 or more. The hydrocarbon group is preferably a substituted or unsubstituted, linear, branched or cyclic alkyl group having 1 to 10 carbon atoms or a substituted or unsubstituted aryl group having 6 to 10 carbon atoms, and is more preferably an unsubstituted alkyl group having 1 to 4 carbon atoms. $R_{31}$, $R_{32}$ and $R_{33}$ are preferably hydrogen atoms, and "q" is preferably an integer of 1 to 4 and is more preferably 1.

In formula G4, each of $R_{41}$, $R_{42}$, $R_{43}$, $R_{44}$ and $R_{45}$ independently represents a hydrogen atom or a hydrocarbon group, and any two of these groups may be combined with each other to form a ring, and "r" represents an integer of 1 or more. The hydrocarbon group is preferably a substituted or unsubstituted, linear, branched or cyclic alkyl group having 1 to 10 carbon atoms or a substituted or unsubstituted aryl group having 6 to 10 carbon atoms, and is more preferably an unsubstituted alkyl group having 1 to 4 carbon atoms. $R_{41}$, $R_{42}$, $R_{43}$, $R_{44}$ and $R_{45}$ are preferably hydrogen atoms, and "r" is preferably an integer of 1 to 4 and is more preferably 1.

In formula G5, each of $R_{51}$, $R_{52}$ and $R_{53}$ independently represents a hydrogen atom or a hydrocarbon group, and any two of these groups may be combined with each other to form a ring, and "s" represents an integer of 1 or more. The hydrocarbon group is preferably a substituted or unsubstituted, linear, branched or cyclic alkyl group having 1 to 10 carbon atoms or a substituted or unsubstituted aryl group having 6 to 10 carbon atoms, and is more preferably an unsubstituted alkyl group having 1 to 4 carbon atoms or a phenyl group. $R_{51}$, $R_{52}$ and $R_{53}$ are preferably hydrogen atoms, and "s" is preferably an integer of 1 to 4 and is more preferably 1.

In formula G6, $R_{61}$ represents a hydrogen atom or a hydrocarbon group, and "t" represents an integer of 1 or more. The hydrocarbon group is preferably a substituted or unsubstituted, linear, branched or cyclic alkyl group having 1 to 10 carbon atoms or a substituted or unsubstituted aryl group having 6 to 10 carbon atoms, and is more preferably an unsubstituted alkyl group having 1 to 4 carbon atoms or a phenyl group. $R_{61}$ is preferably a hydrogen atom, and "t" is preferably an integer of 1 to 4 and is more preferably 1.

Specific examples of the crosslinkable groups represented by formula G1 to formula G6 will be shown below, but they are not limited thereto.

G1-1
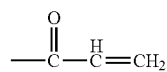

G1-2
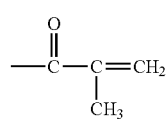

G1-3
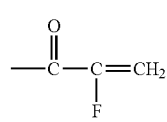

G1-3
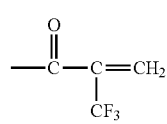

G2-1
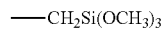

G2-2
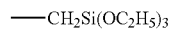

G2-3
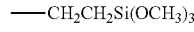

G2-4
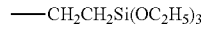

G2-5
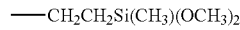

G2-6
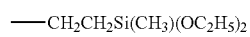

G2-7

G2-8

G2-9

G2-10

G2-11

G2-12
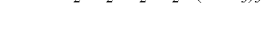

G3-1
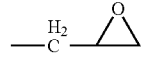

G3-2

-continued

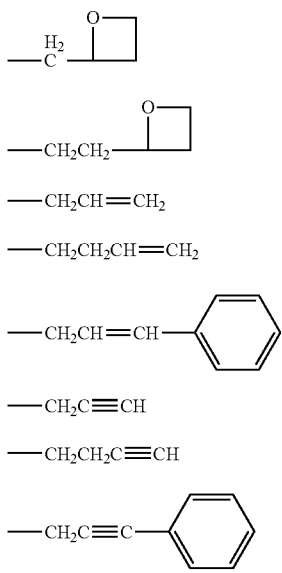

G4-1
G4-2
G5-1
G5-2
G5-3
G6-4
G6-5
G6-6

-continued

H3:

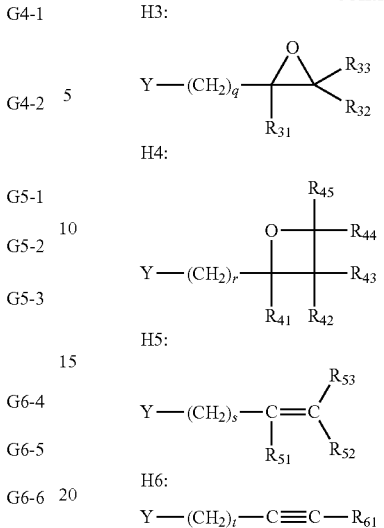

H4:

Y—$(CH_2)_r$—[oxetane ring with $R_{41}, R_{42}, R_{43}, R_{44}, R_{45}$]

H5:

Y—$(CH_2)_s$—$\underset{R_{51}}{C}$=$\underset{R_{52}}{C}\diagdown R_{53}$

H6:

Y—$(CH_2)_t$—C≡C—$R_{61}$ wherein Y represents a hydroxyl group, a mercapto group, an amino group, a halogen atom (of which a chlorine atom, a bromine atom or an iodine atom is preferred), a sulfonyloxy group (e.g., methanesulfonyloxy group, p-toluenesulfonyloxy group, or trifluoromethanesulfonyloxy group); "u" represents an integer of 0 or more; and the other symbols are as defined above in the formulae G1 to G6.

The fluorine-containing compound having, per molecule, 2 or more terminal fluorine-containing vinyl groups each directly bonded to an oxygen atom is reacted with the compound having 2 or more —XH groups, where X represents an oxygen atom or a sulfur atom. In this reaction, when the total number of vinyl groups in the respective material compounds is larger than the total number of the —XH groups, terminal functional groups are mainly occupied by vinyl groups. In this case, the crosslinkable group-introducing agent is one having a terminal nucleophilic group that is reactive with vinyl group. In contrast, when the total number of vinyl groups is smaller than the total number of the —XH groups, terminal functional groups are mainly occupied by —XH groups. In this case, the crosslinkable group-introducing agent is one having a terminal leaving group or a terminal unsaturated bond that is reactive with the —XH group. In the present invention, the latter case is preferred.

Specifically, in a preferred embodiment of the present invention, the compound is one prepared by reacting a compound represented by Formula (I) (preferably a compound represented by Formula (II), and more preferably a compound represented by Formula (III)), with an excess amount, in terms of number of functional groups, of a compound represented by Formula (IV) or (V) (preferably a compound represented by Formula (IV)), and reacting a terminal residual —XH group with a crosslinkable group-introducing agent substituted by leaving group at its terminal.

In Formula (IV) or (V), "n" is preferably 2, and such structures include structures represented by the following Formula (i) (preferably Formula (ii), and more preferably Formula (iii)).

In another embodiment of the present invention, there are provided compounds represented by the following Formula (i), (ii) or (iii):

The compounds according to the present invention are, as described above, crosslinkable fluorine-containing compounds each of which is an adduct compound having a crosslinkable group introduced therein, wherein the adduct compound is prepared by addition reaction of a fluorine-containing compound having, per molecule, 2 or more terminal fluorine-containing vinyl groups each directly bonded to an oxygen atom, with a compound having 2 or more —XH groups, where X represents an oxygen atom or a sulfur atom. The crosslinkable group may be introduced in advance into at least one of the material compounds to be added, i.e., the fluorine-containing compound having, per molecule, 2 or more terminal fluorine-containing vinyl groups each directly bonded to an oxygen atom, and the compound having 2 or more —XH groups, where X represents an oxygen atom or a sulfur atom. However, the crosslinkable group is preferably introduced after the addition reaction. It may be introduced into any position except the terminal of the adduct compound but is preferably introduced through a terminal functional group remained after the addition reaction. Agents for introducing a crosslinkable group include crosslinkable group-introducing groups each composed of a crosslinkable group having, at its terminal, a nucleophilic group (e.g., a hydroxyl group, a mercapto group, or an amino group), a leaving group (e.g., a halogen atom or a sulfonyloxy group), or an unsaturated bond. Specific examples are the following crosslinkable group-introducing group:

H1:

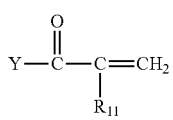

H2:

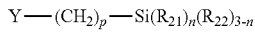

H2':

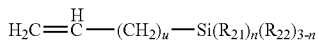

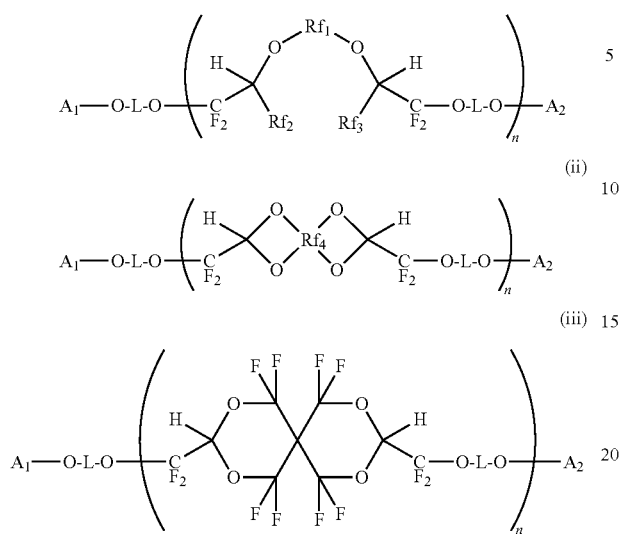

wherein $Rf_1$, $Rf_2$ and $Rf_3$ are as defined above; L represents a divalent organic group and is preferably above-mentioned $CH_2Rf_5CH_2$ or $Ar_1$, wherein $Rf_5$ and $Ar_1$ are as described above; and each of $A_1$ and $A_2$ independently represents a hydrogen atom or a crosslinkable group (preferably any one of above-mentioned groups G1 to G6), provided that one of $A_1$ and $A_2$ is a crosslinkable group.

In Formulae (i) to (iii), "n" represents an integer of 1 or more, and is preferably an integer of 10 to 10,000, more preferably an integer of 50 to 500.

Further, in Formulae (i) to (iii), when "n" is 2 or more, a plurality of parenthesized repeating units may be the same as or different from each other.

In the present invention, a method of synthesizing the fluorine-containing compound having, per molecule, 2 or more terminal fluorine-containing vinyl groups each directly bonded to an oxygen atom for use herein is not particularly limited, and the method includes a series of steps using a liquid-phase fluorination reaction as a key reaction. For example, the compound represented by Formula (I) is synthesized according to the following route. Details of reaction conditions in respective steps may be set with reference to documents such as JP-T-4-500520 ("JP-T" means a published Japanese translation of PCT international application), International Publications WO 00/56694 A and WO 02/004397 A, JP-T-2003-518051, and documents cited in these documents.

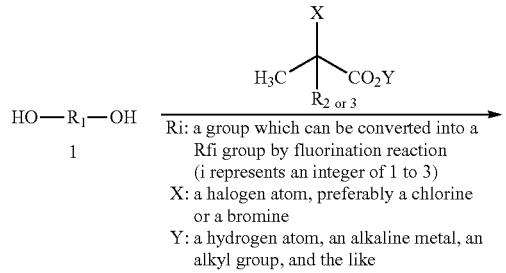

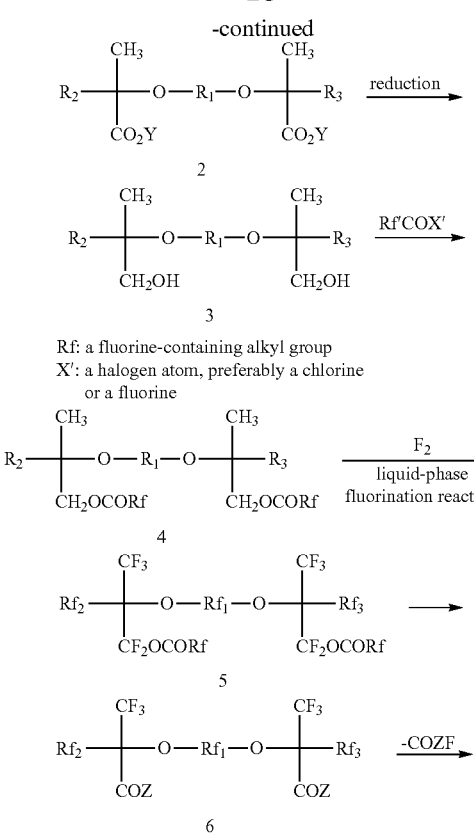

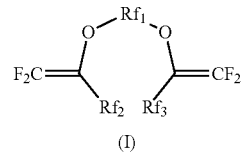

A variety of commercially available products can be used as the compound having 2 or more —XH groups, where X represents an oxygen atom or a sulfur atom. Additionally, a fluorine-containing alcohol represented by Formula (IV) can also be synthesized by carrying out a liquid-phase fluorination reaction to yield an ester derivative such as the compound in Reaction Scheme 6, and reducing the ester derivative with a hydride using reagents such as $LiAlH_4$ or $NaBH_4$.

The fluorine-containing polymers according to the present invention can be obtained through the steps of: (1) carrying out an addition reaction of a suitable combination of a fluorine-containing compound having, per molecule, 2 or more terminal fluorine-containing vinyl groups each directly bonded to an oxygen atom, with a compound having 2 or more —XH groups, wherein X represents an oxygen atom or a sulfur atom to produce an adduct (hereinafter referred to as Step (1)); and (2) introducing a crosslinkable group into the adduct (hereinafter referred to as Step (2)).

An invention related to Step (1) has been filed as another patent application (Japanese Patent Application No. 2007-007514), the outline thereof will be illustrated below.

Step (1) may be conducted in the absence of a catalyst, but is preferably conducted in the presence of a catalyst effective for promoting the reaction. Examples of the catalyst effective for promoting the reaction include basic catalysts and metallic catalysts. Examples of preferable basic catalysts include: inorganic bases such as alkali metal hydroxide (for example, lithium hydroxide, sodium hydroxide, potassium hydroxide, and cesium hydroxide), alkali earth metal hydroxide (for example, magnesium hydroxide, calcium hydroxide, strontium hydroxide, and barium hydroxide), alkali metal carbonate (for example, lithium carbonate, sodium carbonate, potassium carbonate, and cesium carbonate), alkali earth metal carbonate (for example, magnesium carbonate, calcium carbonate, strontium carbonate, and barium carbonate), alkali metal hydrogencarbonate (for example, lithium hydrogencarbonate, sodium hydrogencarbonate, potassium hydrogencarbonate, and cesium hydrogencarbonate), and alkali earth metal hydrogencarbonate (for example, magnesium hydrogencarbonate, calcium hydrogencarbonate, strontium hydrogencarbonate, and barium hydrogencarbonate); and organic bases such as pyridine, picoline, lutidine, collidine, triethylamine, diisopropyl ethylamine, 1,8-diazabicyclo[5.4.0]undecene, and 1,4-diazabicyclo[2.2.2]octane. Examples of more preferable bases include sodium hydroxide, potassium hydroxide, sodium carbonate, potassium carbonate, triethylamine, diisopropyl ethylamine, 1,8-diazabicyclo[5.4.0]undecene, and 1,4-biazabicyclo[2.2.2]octane.

The amount of the base is preferably 0.1 equivalent to 10 equivalent, and more preferably 0.5 equivalent to 5 equivalent, to the group —XH to be reacted.

Examples of preferred metallic catalysts include Group 10 transition metallic catalysts/ligands as described, for example, in Angew. Chem. Int. Ed. 2005, 44, 1128 and JP-A-2006-199625. The amount of the transition metal is preferably 0.005 equivalent to 1 equivalent, and more preferably 0.01 equivalent to 0.1 equivalent, to the group —XH to be reacted.

Step (1) may be performed in a solvent or without a solvent. Examples of preferable solvent include: general organic solvents such as dichloromethane, chloroform, carbon tetrachloride, diethyl ether, dibutyl ether, cyclopentylmethyl ether, diglyme, tetrahydrofuran, dioxane, acetone, ethyl acetate, butyl acetate, hexane, heptane, toluene, xylene, acetonitorile, N,N-dimethylformamide, N,N-dimethylacetoamide, 1-methylpyrrolidone, 1,3-dimethyl-2-imidazolidinone, and dimethylsulfoxide; fluorine-containing solvents such as AK-225 ((registered trademark), manufactured by ASAHI GLASS CO., LTD), 2,2,2-trifluoroethylmethyl ether, 2,2,2-trifluoroethyldifluoromethyl ether, 2,2,3,3,3-pentafluoropropylmethyl ether, 2,2,3,3,3-pentafluoropropyldifluoromethyl ether, 2,2,3,3,3-pentafluoropropyl-1,1,2,2-tetrafluoroethyl ether, 1,1,2,2-tetrafluoroethylmethyl ether, 1,1,2,2-tetrafluoroethylethyl ether, 1,1,2,2-tetrafluoroethyl-2,2,2-trifluoroethyl ether, 2,2,3,3-tetrafluoropropyldifluoromethyl ether, 1,1,2,2-tetrafluoroethyl-2,2,3,3-tetrafluoropropyl ether, hexafluoroisopropylmethyl ether, 1,1,3,3,3-pentafluoro-2-trifluoromethylpropylmethyl ether, 1,1,2,3,3,3-hexafluoropropylmethyl ether, 1,1,2,3,3,3-hexafluoropropylethyl ether, 2,2,3,4,4,4-hexafluorobutyldifluoromethyl ether, fluorobenzene, 1,2-difluorobenzene, 1,3-difluorobenzene, 1,4-difluorobenzene, 2,4-difluorotoluene, 2,6-difluorotoluene, 3,4-difluorotoluene, 1,2,3-trifluorobenzene, 1,2,4-trifluorobenzene, 1,3,5-trifluorobenzene, 2,3,4-trifluorotoluene, 1,2,3,4-tetrafluorobenzene, 1,2,3,5-tetrafluorobenzene, 1,2,4,5-tetrafluorobenzene, pentafluorobenzene, hexafluorobenzene, α,α,α-trifluoromethylbenzene, 1,3-bis(trifluoromethyl)benzene, and 1,4-bis(trifluoromethyl)benzene; and perfluoro solvents such as a perfluoroalkane compound (FC-72 (trade name, manufactured by Sumitomo 3M Limited) or the like), a perfluoroether compound (FC-75, FC-77 (both of which are trade name, manufactured by Sumitomo 3M Limited) or the like), a perfluoropolyether compound (trade name: Krytox (registered trademark, manufactured by Du Pont Kabushiki Kaisha), Fomblin (registered trademark, manufactured by AUSIMONT), Galden (registered trademark, manufactured by AUSIMONT), DEMNUM (manufactured by DAIKIN INDUSTRIES, Ltd.), or the like), a chlorofluorocarbon compound (CFC-11, CFC-113, or the like), a chlorofluoropolyether compound, a perfluorotrialkylamine compound, an inactivated fluid (trade name: Fluorinert (registered trade name, manufactured by Sumitomo 3M Limited)); water; and mixture thereof.

The amount of the solvent is preferably 0.1 time to 100 times, more preferably 1 time to 50 times, and further preferably 2 times to 20 times the weight of the monomers.

Step (1) may be conducted in a two-phase system. In this case, the catalyst is preferably a phase-transfer catalyst that can transfer between the two phases. Examples of such phase-transfer catalysts usable in a two-phase system containing water and an organic solvent include quaternary ammonium salts such as benzyltributylammonium bromide, tetrabutylammonium chloride, and tetrabutylammonium bromide; and quaternary phosphonium salts such as tetrabutylphosphonium bromide and hexadecyltributylphosphonium bromide.

The equivalent ratio of the 2 monomers in Step (1) is represented by the ratio of numbers of olefins involved in the addition reaction to the number of the —XH group, and can be adjusted according to the purpose. It is preferably 0.5 to 2, more preferably 0.8 to 1.25, and still more preferably 1.01 to 1.2.

The reaction temperature in Step (1) is preferably $-20°$ C. to $150°$ C., more preferably $0°$ C. to $100°$ C., and still more preferably $20°$ C. to $80°$ C.

The reaction time in Step (1) may vary depending on the types and amounts of the catalyst, substrates and solvent to be used, the reaction temperature, and the stirring efficiency. While controlling these parameters, the reaction is preferably conducted for 10 minutes to 48 hours, more preferably for 30 minutes to 24 hours, and still more preferably for 1 hour to 12 hours.

Step (2) may employ a reaction promoter and a solvent similar to those of Step (1). Step (2) is preferably conducted in the same system as in Step (1) without extracting the addition product. In this case, another portion of the reaction promoter or solvent may be added to the system.

The crosslinkable group-introducing agent as described in H1 to H6 is charged in an amount of preferably 0.1 equivalent to 10 equivalents, and more preferably 1 to 3 equivalents, to the amount of functional groups, which is considered to be remained after the addition reaction.

The reaction temperature in Step (2) is preferably $-20°$ C. to $150°$ C., more preferably $0°$ C. to $100°$ C., and still more preferably $20°$ C. to $80°$ C.

The reaction time in Step (2) may vary depending on the types and amounts of the catalyst, substrates and solvent to be used, the reaction temperature and the stirring efficiency. While controlling these parameters, the reaction is preferably conducted for 10 minutes to 48 hours, more preferably for 30 minutes to 24 hours, and still more preferably for 1 hour to 12 hours.

According to the present invention, crosslinkable fluorine-containing ether compounds whose structure, such as a main chain structure, and fluorine content are adjustable according to desired physical properties are provided. These compounds have properties specific to fluorine-containing compounds, such as weather resistance, heat resistance, lubricity, low refractive property, low dielectric property, water- and oil-repellency, fouling resistance, low hygroscopicity, chemical resistance, non-adhesiveness, low frictional properties, and electrical insulation properties. In addition, the physical properties of the compounds are adjustable through crosslinking. They are therefore useful in industrial fields such as automobile industry, semiconductor industry, chemical industry and the like.

The present invention will be described in more detail based on the following examples, but the present invention is not limited thereto.

EXAMPLES
Reference Example
Synthesis of Materials
Perfluorodiene (III) and fluorine-containing diol (IV-25) were synthesized according to the following schemes:
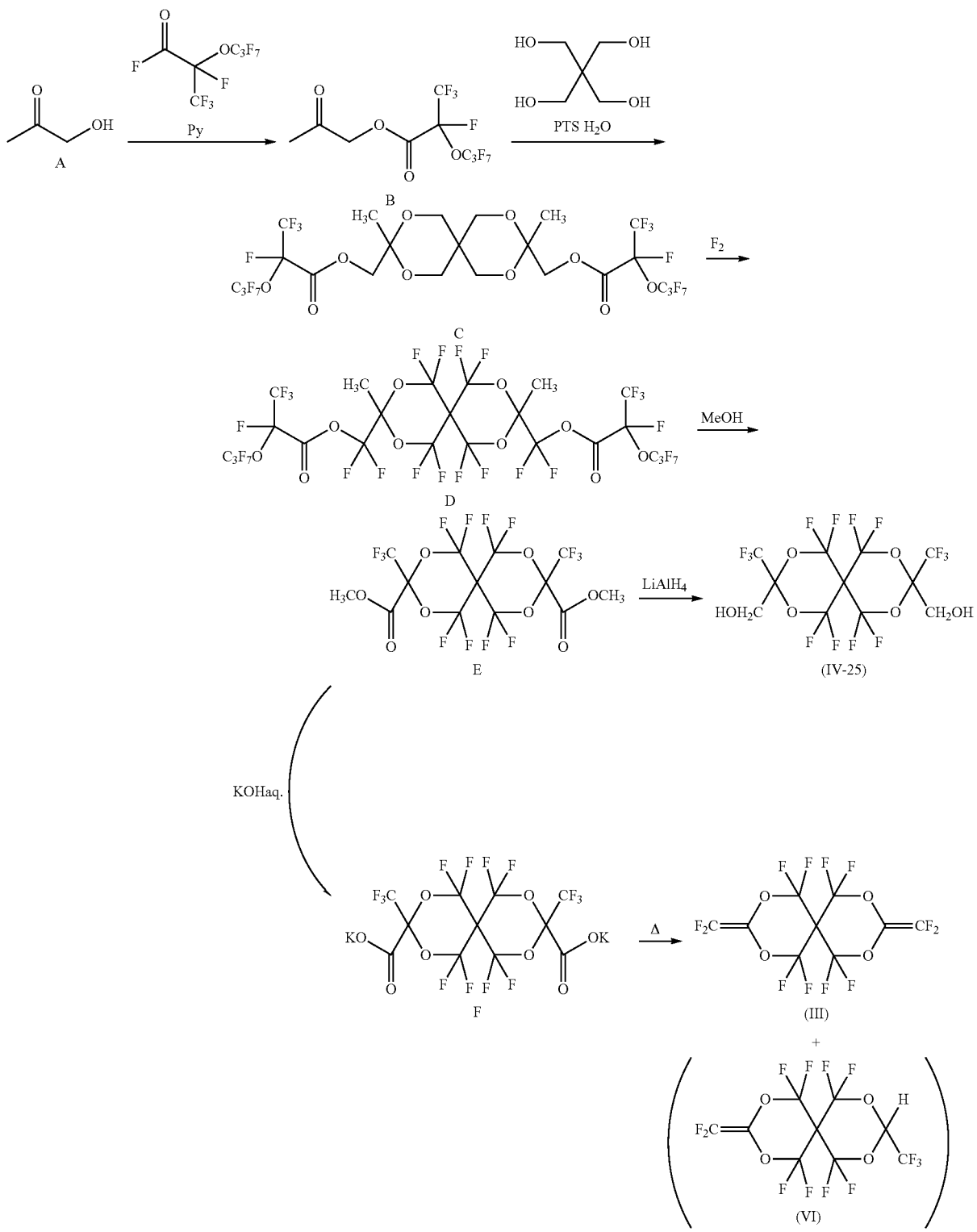

Synthesis of Compound D

A 300 ml Teflon (trademark) container equipped with a raw-material supply port, a fluorine supply port, a helium-gas supply port, and a discharge port connected with a fluorine trap through a refluxing unit cooled by dry ice, was charged with 180 ml of FC-72, and helium gas was blown therein at a flow rate of 50 ml/min at an internal temperature of 20° C. for 30 minutes. Subsequently, 20% $F_2/N_2$ gas was blown at a flow rate of 100 ml/min for 30 minutes. Then, a FC-72 (13.5 ml) solution of Compound C (4.25 g), which was synthesized according to the reaction route described above, and a FC-72 (5 ml) solution of hexafluorobenzene (1 g) were added to the mixture at a flow rate of 6.2 ml/h each while the flow rate of fluorine was kept as it was. Further, 20% $F_2/N_2$ gas was blown at a flow rate of 100 ml/min for 30 minutes, and helium gas was blown at a flow rate of 200 m/min for 30 minutes. The reaction mixture was concentrated under normal pressure, and then further concentrated under reduced pressure, to obtain Compound represented by formula (D) (5.1 g, crude yield: 88%) as almost a single product.

$^{19}$F NMR (CDCl$_3$) δ −60.6 to −64.4 (m, 8F), −76.7 (s, 6F), −79.8 to −80.0 (m, 1F), −80.3 to −80.6 (m, 1F), −82.0 (m, 6F), −82.1 (s, 6F), −83.4 to −83.8 (m, 4F), −86.7 (bs, 1F), −86.9 (bs, 1F), −130.2 (s, 4F), −132.0 (s, 1F), −132.1 (s, 1F)

Synthesis of Compound E

The crude Compound D (5.1 g) obtained above was added dropwise to a dispersion of sodium fluoride (10 g) in methanol (200 ml), followed by stirring at room temperature for 3 hours. After removing insoluble matter by filtration, the filtrate was concentrated to about 30 ml and extracted with a solution of sodium hydrogen carbonate and ethyl acetate. The organic layer was washed with water and a saturated sodium chloride solution and dried with magnesium sulfate. The concentrated residue was purified by column chromatography (developing solvent: ethyl acetate/hexane), to obtain Compound E (1.8 g, 78%).

$^1$H NMR (CDCl$_3$) δ 3.99 (s, 3H)
$^{19}$F NMR (CDCl$_3$) δ −62.5 to −63.8 (m, 4F), −69.9 to −71.3 (m, 4F), −81.2 (s, 3F), −81.4 (s, 3F)

Synthesis of Fluorine-containing Diol (IV-25)

To a solution of Compound E (0.28 g) in diethyl ether (10 ml), lithium aluminum hydride (0.038 g) was added at 5° C. After stirring at room temperature for 4 hours, the reaction mixture was gradually added with diluted hydrochloric acid. After the mixture was extracted with ethyl acetate, the organic layer was washed with Water and a saturated sodium chloride solution, and dried with magnesium sulfate. The concentrated residue was purified by column chromatography (developing solvent: ethyl acetate/hexane), to obtain Compound (IV-25) (0.2 g, 80%).

$^1$H NMR (CDCl$_3$) δ 2.20 (bs, 1H), 4.21 (bs, 2H)
$^{19}$F NMR (CDCl$_3$) δ −56.2 to −58.6 (m, 4F), −66.0 to −67.3 (m, 4F), −80.9 to −81.0 (m, 6F)

Synthesis of Perfluorodiene (III)

To a solution of Compound E (16.2 g) in methanol (200 ml) and water (40 ml), 10 ml of an 8 N aqueous potassium hydroxide solution was added dropwise, at room temperature. The reaction mixture was stirred at room temperature for 2 hours, and the solvent was distilled off under reduced pressure. The concentrated residue was added with 30 ml of water, and further added dropwise with concentrated hydrochloric acid until the mixture became acidic on a pH indicator paper. The precipitated white crystals were filtered, dispersed in water (30 ml), and added dropwise with a 1 N aqueous potassium hydroxide solution to thereby adjust a pH to 8. The reaction mixture was concentrated under reduced pressure, the residue was thoroughly dried at 100° C. using a vacuum pump, to obtain Compound F (16.5 g, 93%). The obtained Compound F was thermally decomposed at 280° C. under reduced pressure (4 mmHg), and volatile components were collected by a trap at −78° C. This procedure was repeated, the collected liquids were combined, distilled under reduced pressure, and thereby yielded crude material (20 g) of Compound (III). The crude material had a purity by gas chromatography of 95%, with the residual 5% being a monoene (VI). To a solution of the crude material (15 g) of Perfluorodiene (III) in anhydrous diethyl ether (150 ml), a 1.6 M solution of lithium bis(trimethylsilyl)amide in THF (3 ml) was added dropwise at 5° C. in a nitrogen atmosphere. After stirring at room temperature for 16 hours, diluted hydrochloric acid was poured to stop the reaction. The organic layer was washed with an aqueous sodium chloride solution three times, and the solvent was distilled off at 40° C. to 80° C. Purification by distillation at further elevated temperatures under atmospheric pressure produced Perfluorodiene (III) (9.6 g) with a purity by gas chromatography of 99% or more.

$^{19}$F NMR (CDCl$_3$) δ −70.7 (s, 8F), −111.2 (s, 4F), b.p. 55° C. (20 mmHg)

Example 1

Polymerization of Perfluorodiene (III) and Fluorine-Containing Diol (IV-25)

Perfluorodiene (III) (1.8 g), Fluorine-containing Diol (IV-25) (2.5 g), potassium carbonate (3.5 g) and acetonitrile (100 ml) were stirred at 35° C. for 48 hours. The resulting solution was added with acryloyl chloride (0.5 g) and methylhydroquinone (0.005 g), followed by stirring at 35° C. for 24 hours and cooling to room temperature. The solution was diluted with water (200 ml), stirred for 15 minutes, and extracted with ethyl acetate (300 ml). The organic layer was washed with water and a saturated sodium chloride solution and dried with magnesium sulfate. By removing magnesium sulfate by filtration and then concentrating under reduced pressure, a viscous oily matter (4.9 g) was obtained. This was found by $^1$H-NMR and $^{19}$F-NMR to be a polymer of the following structure and to contain no free hydroxyl group.

$^1$HNMR (CD$_3$COCD$_3$) δ 4.75 (s), 4.90 (bs), 6.07 (d, J=10.5), 6.25 (dd, J=10.5, 17.1), 6.44 (bs), 6.50 (d, J17.1)
$^{19}$F NMR (CD$_3$COCD$_3$) δ −57.62 to −58.94 (m), −67.27 to −68.90 (m), −71.81 to −73.35 (m), −81.50 (s), −81.74 (s), −88.67 (s)

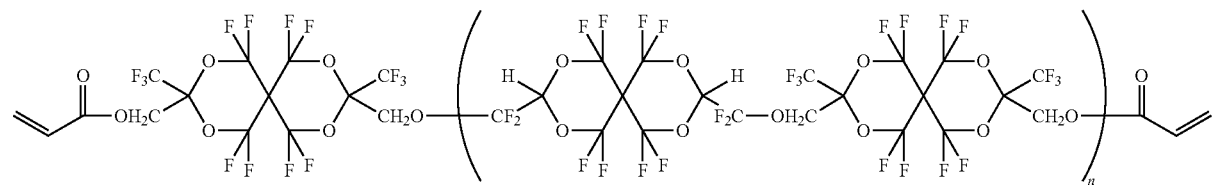

A gel permeation chromatography (GPC) analysis revealed that this polymer had a number average molecular weight in terms of polystyrene of 8,500. 30 percent by weight solution of methyl ethyl ketone was prepared, in which a mixture of the obtained polymer and a photoinitiator (Irg 907 manufactured by Ciba Specialty Chemicals Corporation) has a ratio of 95:5, and filtered through a polytetrafluoroethylene filter with a pore size of 0.25 μm. The filtered solution was applied to a glass substrate with a bar coater. After drying at 90° C., the applied film was irradiated with 1 joule (J) of an ultraviolet ray in a nitrogen atmosphere, further heated at 120° C. for 10 minutes, and cooled to room temperature, to obtain a coated film having a thickness of 0.2 μm. The coated film was analyzed and found to have the following properties.

Pencil hardness: 3H
Refractive index: 1.38
Contact angle of water: 90°
Sliding angle of water: 16°
Antifouling property: Good (When a straight line of 1 cm long was drawn on the film with an oil-based ink pen (Mackee ultra-fine manufactured by ZEBRA Co., Ltd.), the ink was repelled from the film and formed spherical droplets. This ink was fully wiped off with a cellulose nonwoven fabric (BEMCOT M-3 manufactured by Asahi Chemical Industry Co., Ltd.).)
(Measuring Methods)
Pencil hardness: This was measured according to the method specified in JIS K 5400.
Refractive index: This was measured with an Abbe refractometer (manufactured by ATAGO Co., Ltd.).
Contact angle and sliding angle of water: A droplet of distilled water 1.0 mm in diameter was formed on the coated film, and the contact angle and sliding angle thereof were measured with a contact angle meter (manufactured by Kyowa Interface Science Co., Ltd.).

Example 2

Polymerization Example of Perfluorodiene (III) and Fluorine-Containing Diol (IV-2)

Perfluorodiene (III) (1.8 g), Fluorine-containing Diol (IV-2) (0.81 g), potassium carbonate (3.5 g) and methyl ethy ketone (30 ml) were stirred at room temperature for 50 hours. The resulting solution was added with methacryloyl chloride (0.5 g) and methylhydroquinone (0.005 g), followed by stirring at room temperature for 24 hours. The solution was added with water (100 ml), stirred for 15 minutes and then extracted with ethyl acetate (200 ml). The organic layer was washed with water and a saturated sodium chloride solution and dried with magnesium sulfate. By removing magnesium sulfate by filtration and then concentrating under reduced pressure, a viscous oily matter (2.7 g) was obtained. This was found by $^1$H-NMR and $^{19}$F-NMR to be a polymer of the following structure and to contain no free hydroxyl group.

$^1$HNMR (CD$_3$COCD$_3$) δ 4.73 (t, J=13.5 Hz), 6.07 (d, J=10.5), 6.25 (dd, J=10.5, 17.1), 6.41 (bs), 6.50 (d, J=17.1)

$^{19}$F NMR (CD$_3$COCD$_3$) δ –67.90 to –68.88 (m), –71.63 to –73.30 (m), –88.72 (s), –88.82 (s), –122.70 (t, J=13.5 Hz)

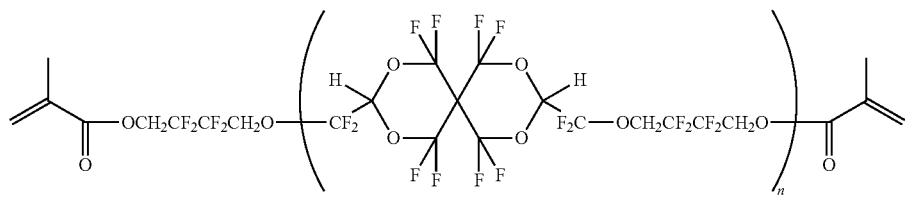

A GPC analysis revealed that this polymer had a number average molecular weight in terms of polystyrene of 15,000. The polymer showed a low refractive index of 1.36.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A crosslinkable fluorine-containing compound, which is an adduct compound having a crosslinkable group at a terminal functional group of the adduct compound, the adduct compound being derived from a crosslinkable group-introducing agent, wherein the adduct compound is an adduct of a fluorine-containing compound having, per molecule, 2 or more terminal fluorine-containing vinyl groups each directly bonded to an oxygen atom, and a compound having 2 or more groups represented by —XH, where X represents an oxygen atom or a sulfur atom, and wherein the crosslinkable group is represented by any one of the following formulae G1 to G6:

G1:

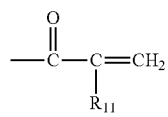

G2:

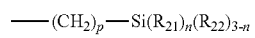

G3:

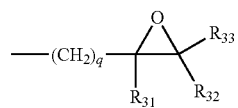

G4:

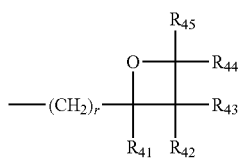

G5:

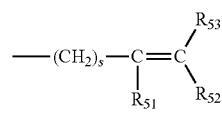

G6:

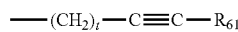

wherein $R_{11}$ represents a hydrogen atom, a fluorine atom, a trifluoromethyl group or an alkyl group having 1 to 4 carbon atoms; $R_{21}$ represents a hydroxyl group, an isocyanato group or a hydrolyzable group; $R_{22}$ represents a hydrogen atom or a hydrocarbon group; each of $R_{31}$, $R_{32}$ and $R_{33}$ independently represents a hydrogen atom or a hydrocarbon group, and any two of these groups may be combined with each other to form a ring; each of $R_{41}$, $R_{42}$, $R_{43}$, $R_{44}$ and $R_{45}$ independently represents a hydrogen atom or a hydrocarbon group, and any two of these groups may be combined with each other to form a ring; each of $R_{51}$, $R_{52}$ and $R_{53}$ independently represents a hydrogen atom or a hydrocarbon group, and any two of these groups may be combined with each other to form a ring; $R_{61}$ represents a hydrogen atom or a hydrocarbon group; each of "p", "q", "r", "s", and "t" independently represents an integer of 1 or more; and "n" represents an integer of 1 to 3.

2. The crosslinkable fluorine-containing compound as claimed in claim 1, which is represented by the following Formula (i):

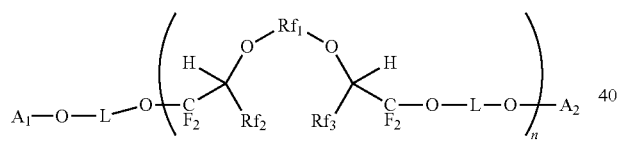

wherein L represents a divalent organic group; $Rf_1$ represents a perfluoroalkylene group, each of $Rf_2$ and $Rf_3$ independently represents a fluorine atom, a perfluoroalkyl group or a perfluoroalkoxy group, and any two of $Rf_1$, $Rf_2$ and $Rf_3$ may be combined with each other to form a ring; each of $A_1$ and $A_2$ independently represents a hydrogen atom or a crosslinkable group, and at least one of $A_1$ and $A_2$ is a crosslinkable group; and "n" represents an integer of 1 or more.

3. The fluorine-containing compound according to claim 2, where the crosslinkable groups represented by $A_1$ and $A_2$ are each represented by any one of the following formulae G1 to G6:

G1:

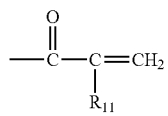

G2:

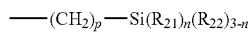

G3:

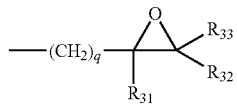

G4:

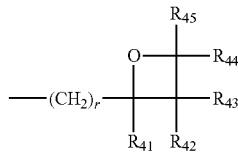

G5:

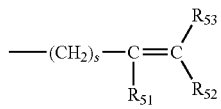

G6:

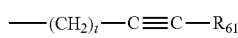

wherein $R_{11}$ represents a hydrogen atom, a fluorine atom, a trifluoromethyl group or an alkyl group having 1 to 4 carbon atoms; $R_{21}$ represents a hydroxyl group, an isocyanato group or a hydrolyzable group; $R_{22}$ represents a hydrogen atom or a hydrocarbon group; each of $R_{31}$, $R_{32}$ and $R_{33}$ independently represents a hydrogen atom or a hydrocarbon group, and any two of these groups may be combined with each other to form a ring; each of $R_{41}$, $R_{42}$, $R_{43}$, $R_{44}$ and $R_{45}$ independently represents a hydrogen atom or a hydrocarbon group, and any two of these groups may be combined with each other to form a ring; each of $R_{51}$, $R_{52}$ and $R_{53}$ independently represents a hydrogen atom or a hydrocarbon group, and any two of these groups may be combined with each other to form a ring; $R_{61}$ represents a hydrogen atom or a hydrocarbon group; each of "p", "q", "r", "s", and "t" independently represents an integer of 1 or more; and "n" represents an integer of 1 to 3.

4. The crosslinkable fluorine-containing compound as claimed in claim 1, which is represented by the following Formula (ii):

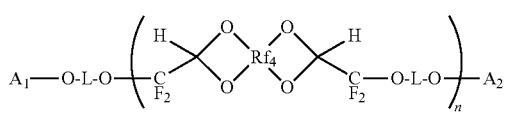

wherein L represents a divalent organic group; $Rf_4$ represents a tetravalent perfluorinated linkage group; each of $A_1$ and $A_2$ independently represents a hydrogen atom or a crosslinkable group, and at least one of $A_1$ and $A_2$ is a crosslinkable group; and "n" represents an integer of 1 or more.

5. The fluorine-containing compound according to claim 4, where the crosslinkable groups represented by $A_1$ and $A_2$ are each represented by any one of the following formulae G1 to G6:

G1:
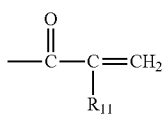

G2:
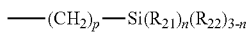

G3:
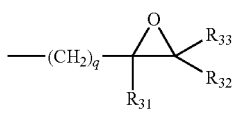

G4:
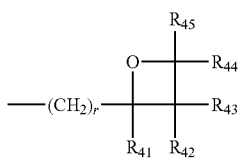

G5:
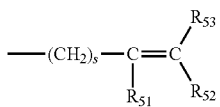

G6:
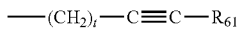

wherein $R_{11}$ represents a hydrogen atom, a fluorine atom, a trifluoromethyl group or an alkyl group having 1 to 4 carbon atoms; $R_{21}$ represents a hydroxyl group, an isocyanato group or a hydrolyzable group; $R_{22}$ represents a hydrogen atom or a hydrocarbon group; each of $R_{31}$, $R_{32}$ and $R_{33}$ independently represents a hydrogen atom or a hydrocarbon group, and any two of these groups may be combined with each other to form a ring; each of $R_{41}$, $R_{42}$, $R_{43}$, $R_{44}$ and $R_{45}$ independently represents a hydrogen atom or a hydrocarbon group, and any two of these groups may be combined with each other to form a ring; each of $R_{51}$, $R_{52}$ and $R_{53}$ independently represents a hydrogen atom or a hydrocarbon group, and any two of these groups may be combined with each other to form a ring; $R_{61}$ represents a hydrogen atom or a hydrocarbon group; each of "p", "q", "r", "s", and "t" independently represents an integer of 1 or more; and "n" represents an integer of 1 to 3.

6. The crosslinkable fluorine-containing compound as claimed in claim 1, which is represented by the following Formula (iii):

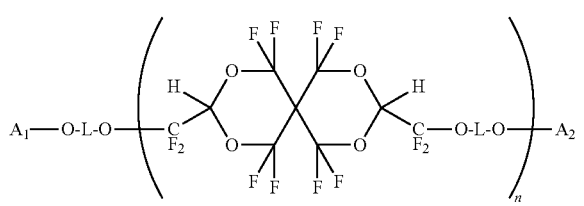

(iii)

wherein L represents a divalent organic group; each of $A_1$ and $A_2$ independently represents a hydrogen atom or a crosslinkable group, and at least one of $A_1$ and $A_2$ is a crosslinkable group; and "n" represents an integer of 1 or more.

7. The fluorine-containing compound according to claim 6, where the crosslinkable groups represented by $A_1$ and $A_2$ are each represented by any one of the following formulae G1 to G6:

G1:
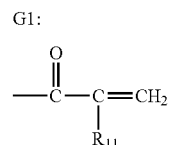

G2:
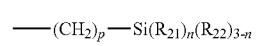

G3:
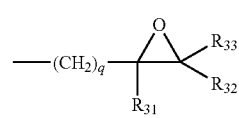

G4:
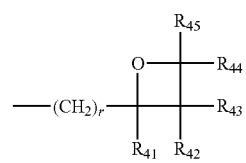

G5:
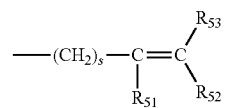

G6:
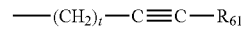

wherein $R_{11}$ represents a hydrogen atom, a fluorine atom, a trifluoromethyl group or an alkyl group having 1 to 4 carbon atoms; $R_{21}$ represents a hydroxyl group, an isocyanato group or a hydrolyzable group; $R_{22}$ represents a hydrogen atom or a hydrocarbon group; each of $R_{31}$, $R_{32}$ and $R_{33}$ independently represents a hydrogen atom or a hydrocarbon group, and any two of these groups may be combined with each other to form a ring; each of $R_{41}$, $R_{42}$, $R_{43}$, $R_{44}$ and $R_{45}$ independently represents a hydrogen atom or a hydrocarbon group, and any two of these groups may be combined with each other to form a ring; each of $R_{51}$, $R_{52}$ and $R_{53}$ independently represents a hydrogen atom or a hydrocarbon group, and any two of these groups may be combined with each other to form a ring; $R_{61}$ represents a hydrogen atom or a hydrocarbon group; each of "p", "q", "r", "s", and "t" independently represents an integer of 1 or more; and "n" represents an integer of 1 to 3.

8. The crosslinkable fluorine-containing compound as claimed in claim 1, wherein the fluorine-containing compound having, per molecule, 2 or more terminal fluorine-containing vinyl groups each directly bonded to an oxygen atom is represented by Formula (I):

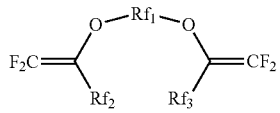

Formula (I)

wherein $Rf_1$ represents a perfluoroalkylene group, $Rf_2$ and $Rf_3$ independently represents a fluorine atom, a perfluoroalkyl group or a perfluoroalkoxy group, and any two of $Rf_1$, $Rf_2$ and $Rf_3$ may be combined with each other to form a ring.

9. The crosslinkable fluorine-containing compound as claimed in claim 1, wherein the fluorine-containing compound having, per molecule, 2 or more terminal fluorine-containing vinyl groups each directly bonded to an oxygen atom is represented by Formula (II):

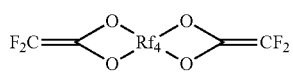

Formula (II)

wherein $Rf_4$ represents a tetravalent perfluorinated linkage group.

10. The crosslinkable fluorine-containing compound as claimed in claim 1, wherein the fluorine-containing compound having, per molecule, 2 or more terminal fluorine-containing vinyl groups each directly bonded to an oxygen atom is represented by Formula (III):

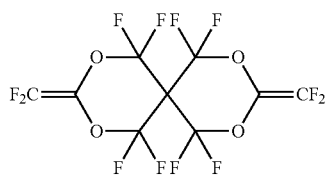

Formula (III)

11. The crosslinkable fluorine-containing compound as claimed in claim 1, wherein the compound having 2 or more groups represented by —XH is represented by Formula (IV):

Formula (IV)

$Rf_5(CH_2OH)_n$ (IV)

wherein $Rf_5$ represents a perfluoroalkyl group having a valence of "n"; and "n" represents an integer of 2 to 6.

12. The crosslinkable fluorine-containing compound as claimed in claim 1, wherein, when $R_{21}$ represents a hydrolyzable group, the hydrorayzable group is selected from the group consisting of a halogen atom, an alkoxy group, and an acyloxy group.

13. The crosslinkable fluorine-containing compound as claimed in claim 1, wherein, when $R_{22}$ represents a hydrocarbon group, the hydrocarbon group is selected from the group consisting of a substituted or unsubstituted, linear, branched or cyclic alkyl group having 1 to 10 carbon atoms, a substituted or unsubstituted, linear, branched or cyclic alkenyl group having 2 to 10 carbon atoms, a substituted or unsubstituted, linear, branched or cyclic alkynyl group having 2 to 10 carbon atoms, or a substituted or unsubstituted aryl group having 6 to 10 carbon atoms.

14. The crosslinkable fluorine-containing compound as claimed in claim 1, wherein, when any of $R_{31}$, $R_{32}$ and $R_{33}$ represents a hydrocarbon group, the hydrocarbon group is selected from the group consisting of a substituted or unsubstituted, linear, branched or cyclic alkyl group having 1 to 10 carbon atoms or a substituted or unsubstituted aryl group having 6 to 10 carbon atoms.

15. The crosslinkable fluorine-containing compound as claimed in claim 1, wherein, when any of $R_{41}$, $R_{42}$, $R_{43}$, $R_{44}$ and $R_{45}$ represents a hydrocarbon group, the hydrocarbon group is selected from the group consisting of a substituted or unsubstituted, linear, branched or cyclic alkyl group having 1 to 10 carbon atoms or a substituted or unsubstituted aryl group having 6 to 10 carbon atoms.

16. The crosslinkable fluorine-containing compound as claimed in claim 1, wherein, when any of $R_{51}$, $R_{52}$ and $R_{53}$ represents a hydrocarbon group, the hydrocarbon group is selected from the group consisting of a substituted or unsubstituted, linear, branched or cyclic alkyl group having 1 to 10 carbon atoms or a substituted or unsubstituted aryl group having 6 to 10 carbon atoms.

17. The crosslinkable fluorine-containing compound as claimed in claim 1, wherein, when $R_{61}$ represents a hydrocarbon group, the hydrocarbon group is selected from the group consisting of a substituted or unsubstituted, linear, branched or cyclic alkyl group having 1 to 10 carbon atoms or a substituted or unsubstituted aryl group having 6 to 10 carbon atoms.

18. The crosslinkable fluorine-containing compound as claimed in claim 1, wherein $R_{11}$ represents a hydrogen atom or a methyl group.

19. The crosslinkable fluorine-containing compound as claimed in claim 1, wherein $R_{21}$ represents a hydroxyl group, a halogen atom or an alkoxy group; $R_{22}$ represents a methyl group, an ethyl group, a vinyl group, an allyl group or a phenyl group; "p" is an integer of 1 to 4, and "n" is 3.

20. The crosslinkable fluorine-containing compound as claimed in claim 1, wherein $R_{31}$, $R_{32}$ and $R_{33}$ represent hydrogen atoms, and "q" is an integer of 1 to 4.

21. The crosslinkable fluorine-containing compound as claimed in claim 1, wherein $R_{41}$, $R_{42}$, $R_{43}$, $R_{44}$ and $R_{45}$ represent hydrogen atoms, and "r" is an integer of 1 to 4.

22. The crosslinkable fluorine-containing compound as claimed in claim 1, wherein $R_{51}$, $R_{52}$ and $R_{53}$ represent hydrogen atoms, and "s" is an integer of 1 to 4.

23. The crosslinkable fluorine-containing compound as claimed in claim 1, wherein $R_{61}$ represents a hydrogen atom, and "t" is an integer of 1 to 4.

* * * * *